(12) United States Patent
Lavery et al.

(10) Patent No.: US 10,157,303 B1
(45) Date of Patent: Dec. 18, 2018

(54) SYSTEMS AND METHODS FOR STEERING ONE OR MORE PRODUCT READERS AND DETERMINING PRODUCT ATTRIBUTES

(71) Applicant: SYMBOL TECHNOLOGIES, LLC, Lincolnshire, IL (US)

(72) Inventors: Richard J. Lavery, Huntington, NY (US); Thomas E. Wulff, Brookhaven, NY (US); Rehan K. Jaffri, New York, NY (US); Sean Connolly, Stony Brook, NY (US); David Bellows, Wantagh, NY (US); Sean D. Marvel, Hampton Bays, NY (US); Russell Calvarese, Stony Brook, NY (US); Marco P. Orlassino, Centereach, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/706,171

(22) Filed: Sep. 15, 2017

(51) Int. Cl.
*G06K 7/10* (2006.01)
*G06K 7/14* (2006.01)
*G07G 1/00* (2006.01)

(52) U.S. Cl.
CPC ....... *G06K 7/1443* (2013.01); *G06K 7/10128* (2013.01); *G06K 7/10425* (2013.01); *G07G 1/009* (2013.01)

(58) Field of Classification Search
CPC ............. G06K 7/0004; G06K 7/10089; G06K 7/10356; G07G 1/009
USPC ....................................................... 235/383
See application file for complete search history.

(56) References Cited

U.S. PATENT DOCUMENTS

| 7,821,400 B2 * | 10/2010 | Tabet | G01G 19/4144 |
| | | | 235/385 |
| 9,892,289 B2 * | 2/2018 | Zumsteg | G06K 7/0004 |
| 9,971,919 B1 * | 5/2018 | Lavery | G06K 7/10425 |

* cited by examiner

*Primary Examiner* — Seung H Lee
(74) *Attorney, Agent, or Firm* — Yuri Astvatsaturov

(57) ABSTRACT

Systems and methods for product reader control are described. In various aspects, the product reader control is enhanced with image sensor(s) for steering product reader(s) to determine product attributes associated with scanned products. The product reader control system and methods may capture, with the image sensor(s), one or more images associated with a product. The product may have a product identifier and the product may be located within an onsite venue. Based on the detection of the product identifier in the image(s), a first product reader may be steered in a direction of the product, where the first product reader is located within the onsite venue with the product. The first product reader may scan the product such that the scanning determines at least one attribute associated with the product.

24 Claims, 6 Drawing Sheets

SYSTEMS AND METHODS FOR STEERING ONE OR MORE PRODUCT READERS AND DETERMINING PRODUCT ATTRIBUTES

BACKGROUND OF THE INVENTION

Radio frequency identification (RFID) is typically employed at retail locations for the purpose of identifying RFID tags attached to objects. RFID tags can provide information to an RFID reader, where such information can pertain to the object to which the RFID tag is attached. In this way an RFID reader, which is typically a two-way radio transceiver, can send a radio signal to an RFID tag and read its response.

Several problems can arise, however, when RFID technology is employed at or near RFID-based point-of-sale (POS) stations, POS lanes, or other similar high traffic areas within a particular retail area or location. Typically, POS readers located in such areas experience a high amount of interference from other RFID readers or other similar devices having similar radio frequencies (RF) and/or experience high level of read errors associated with the typical high traffic and volume of RFID tags, products, or individuals is such areas. For example, the read performance at or near POS stations, POS lanes, or other similar high traffic areas can diminish such that the rate at which false reads or missed reads occur increases. This can be a function of the level of activity and actions of customers, store personnel, or other individuals and/or products, RFID tags in such high traffic areas.

Accordingly, there is a need for systems and methods for adaptively optimizing RFID-based POS performance.

In addition, there is a further need for systems and methods for steering product readers and determining product attributes.

Still further, there is a need for systems and methods for POS detection with image sensors for identifying new RFID tag events within a particular vicinity of an RFID reader.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
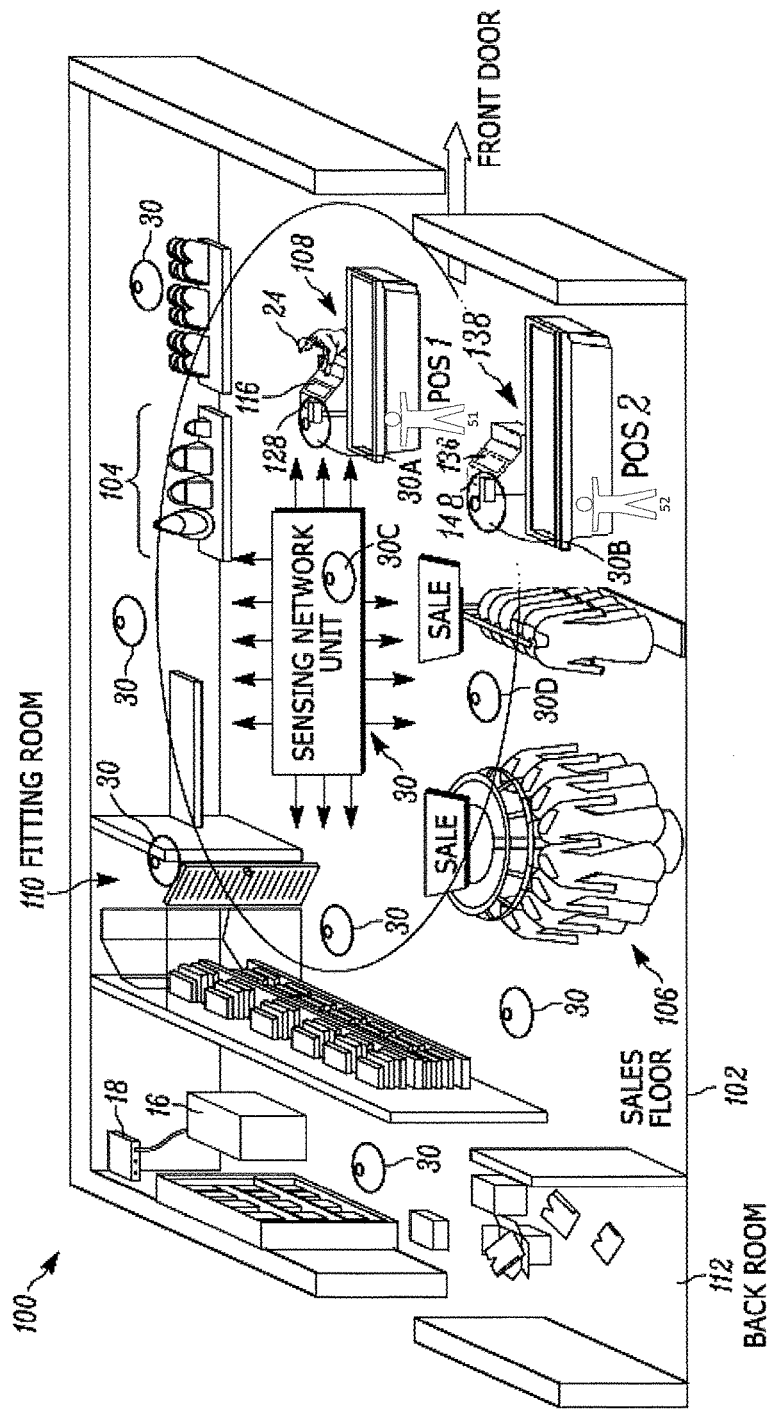
FIG. 1 is a perspective view, as seen from above, of a retail venue having multiple POS stations, lanes, and detector stations, in accordance with example embodiments herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The embodiments of the present disclosure utilize RFID readers, camera devices or other image sensors, and other similar devices, which are networked within a retail venue, e.g., a retail store location, to create intelligent systems and methods to address the issues of optimizing and enhancing the read performance, accuracy, or operation of RFID readers or related devices. As described herein, assuming the availability of RFID readers, camera devices, or other such devices, systems and methods can be implemented that identify objects (e.g., with video capture or RFID tags), and provide information to the system in order to perform the optimized RFID reading and/or other features, functionally, and/or methods as described herein.

As described for various embodiments herein, an RFID-based system, or other similar information-based identification system such as a barcode scanning system, can experience errors and reduced read accuracy in high traffic areas because of radio interference, density issues, or other such issues affecting radio, laser, or other reader or scanner capabilities. As described for various embodiments herein, the use of a video camera (image sensor), or network of video cameras (image sensors), installed either with a reader, above it, or in the same vicinity of the reader, can be used to optimize reader or other scanner device performance.

Accordingly, as described herein, several embodiments of the present disclosure are directed to systems and methods for adaptively optimizing RFID-based POS performance. The POS system and methods may include one or more processors and one or more image sensors configured to aggregate image(s), where the image(s) may have been captured by the image sensor(s) and where the image sensor(s) may be associated with a first RFID reader.

A first density value may be determined based on the image(s), where the first density value may be associated with a first set of individuals or a first set of products located within a first POS lane. In addition, a second density value may also be determined based on the image(s), where the second density value is associated with a second set of individuals or a second set of products located within a second POS lane. The second POS lane may be positioned adjacent to the first POS lane.

Based on the first density value and the second density value, a reader parameter associated with the first RFID reader may then be updated, for example, to optimize the first RFID reader that may be associated with one or both of the POS lanes.

In some embodiments, the updated reader parameter may impact a number features, functions, or performance values of the RFID reader that may each, together or alone, control the operation of the RFID reader. For example, the reader parameter may be any of a power value, a duty cycle value, a dwell time value, a session value, a link profile value, a state flag value, or a select flag value of the RFID reader.

In other embodiments, the first POS lane may be associated with the first RFID reader and the second POS lane may be associated with a second RFID reader. In such embodiments, a first POS read operation of the first RFID reader may be staggered with respect to a second POS read operation of the second RFID reader when the first density value and the second density value exceed an activity level threshold.

In still further embodiments, a particular RFID reader, such as the first RFID reader, the second RFID reader, or some other RFID reader, associated with a particular POS lane, such as the first POS lane, second POS lane, or some other POS lane, may be deactivated by the POS system where the particular POS lane has a lane state indicator with an offline status. In some embodiments, the lane state indicator may be a lane status indicator light. The offline status may be determined, for example, from the one or more images captured from the image sensors.

As described herein, additional embodiments of the present disclosure are directed to product reader control systems and methods that are enhanced with image sensor(s) for steering one or more product readers to determine, via one or more processors, product attributes associated with scanned product(s). For example, the product reader control system and methods may capture, with the image sensor(s), one or more images associated with a product located within an onsite venue. The product may have a product identifier. In some embodiments, the product identifier may be an RFID tag. In other embodiments, the product identifier may be a product barcode.

Based on the detection of the product identifier in the image(s), a first product reader may be steered in a direction of the product, where the first product reader is located within the onsite venue with the product. In some embodiments, the first product reader may be an RFID reader. In other embodiments, the first product reader may be a barcode scanner. In still further embodiments, the first product reader may be mechanically steered to the direction of the product based on a position of the product identifier determined from the image(s). In other embodiments, the first product reader may be electronically steered to the direction of the product based on a position of the product identifier determined from the image(s). In still further embodiments, the first product reader may be both electronically and mechanically steered as described herein.

The first product reader may scan the product such that the scanning determines at least one attribute associated with the product. For example, the attribute may be a price associated with the product.

In some embodiments, a second product reader may also be located within the onsite venue. In such embodiments, the second product reader may be steered in the direction of the product based on the detection of the product identifier in the image(s) captured by the image sensor(s).

The product reader control system and methods may further include a POS area having a POS reading zone. In various embodiments, the POS reading zone may be configured to receive products such that the product is determined to be not placed completely within the reader zone based the image(s) captured by the image sensor(s). In other embodiments, the reading zone may occupy an area associated with the bottom of a shopping cart and the first product reader may be steered toward the area when the shopping cart is located within the POS area. In some embodiments, the first product reader may be located at a bottom portion of a POS station associated with the POS area, for example, such that the first product reader would be able to scan the reading zone associated with the bottom of the shopping cart. In still further embodiments, the first product reader may be located at a ceiling portion of the onsite venue associated with the POS area, where, for example, the first product reader would be able to scan products from the ceiling and/or above the products moving into the POS area.

The product reader control system and methods may further include an area outside of a POS lane or POS area (e.g., a non-POS area), for example, where such a non-POS area may be located outside of any POS lane. The non-POS area may be configured to be imaged with the image sensor(s) and further configured to be scanned with the first product reader for purposes of determining a product attribute as described herein.

As described herein, additional embodiments of the present disclosure are directed to systems and methods for using one or more image sensors to identify new RFID tag events within a particular vicinity of an RFID reader. For example, in various embodiments, one or more processors of a POS system may cause the one or more image sensors to capture a first set of one or more video images, where the first set of video images may be captured at a first time and may depict a first RFID tag environment. The first RFID tag environment may be static such that the first set of one or more video images does not depict a person moving within the first RFID tag environment. The first RFID tag environment may be associated with at least a portion of the particular vicinity of the RFID reader.

The one or more processors may generate an environment database that includes static analytic information determined from the first set of one or more video images and the RFID reader.

In addition, the one or more processors of the POS system may cause the one or more image sensors to capture a second set of one or more video images, where the second set of video images may be captured at a second time and may depict a second RFID tag environment. The second RFID tag environment may be active such that the second set of one or more video images depicts at least one person moving within the second RFID tag environment. The second RFID tag environment may also be associated with at least a portion of the particular vicinity of the RFID reader. In certain embodiments, the person moving through the second RFID tag environment may be located within a POS lane. The person may be associated with a product for purchase and the product for purchase may be associated with an RFID tag. In other embodiments, the one or more processors may be configured to eliminate at a false RFID tag event that occurs at the second time within the particular vicinity of the RFID reader.

The one or more processors may update the environment database to include active analytic information determined from the second set of one or more video images and the RFID reader, and may also determine at least one RFID tag event based upon the static analytic information and the active analytic information.

In several embodiments, the static analytic information may include the first set of one or more video images and a first set of RFID tag identifiers (IDs), where the first set of RFID tag IDs may be associated with the first RFID tag environment. Similarly, the active analytic information may include the second set of one or more video images and a second set of RFID tag identifiers (IDs), where the second set of RFID tag IDs may be associated with the second RFID tag environment.

In some embodiments, the one or more processors of the POS system may update the environment database with additional analytic information determined from a third set of one or more video images and the RFID reader. The third set of one or more video images may have been captured at a third time and may depict a third RFID tag environment associated with the at least a portion of the particular vicinity of the RFID reader. Depending on the embodiment, the third RFID tag environment may be either static or active.

FIG. 1 illustrates a perspective view, as seen from above, of a retail venue 100 illustrating an arrangement for selectively activating a radio frequency RFID reader within the retail venue having multiple POS lanes in the venue in which detector stations 30 are deployed. In the example embodiment of FIG. 1, the retail venue includes a backroom 112 that has a centralized controller 16. The retail venue also includes a fitting room 110, and a retail sales floor 102 with various retail items (e.g., 104 and 106), and two POS stations (108 and 138) that each have respective POS lanes (POS lane 1 and POS lane 2). Each of the POS stations (108 and 138) may include various equipment. For example, POS station 108 may include a computer system 116 and an interface 128 that may include, for example, an optical scanner, touchpad, keypad, display, and data input/output interface connecting to the computer system 116. The computer system 116 may be operated by store personnel 24, which may be, for example, an employee, contract worker, owner, or other operator of the retail store. POS station 138 may similarly include a computer system 136 and an interface 148 that may include, for example, an optical scanner, touchpad, keypad, display, and data input/output interface connecting to the computer system 136. POS station 138 is not operated by store personnel and, therefore, at least in some embodiments may represent a closed, inactive, or otherwise empty POS lane or station.

Each of the POS stations 108 and 138 have related POS lanes, which include POS lane 1 and POS lane 2, respectively. Individuals, such as customers, store personnel, or other individuals, may reside in, move through, or otherwise occupy the POS lanes at various times. Such individuals may be carrying, or associated with (e.g., pushing a shopping cart, etc.) one or more related products (e.g., products 104 or 106) or other store merchandise. For example, one or more individual(s) 51 may occupy POS lane 1, where individual(s) 51 may represent customers at POS station 108 checking out, standing in line, and/or interacting with store personnel 24.

As another example, one or more individual(s) 52 may occupy or move through POS lane 2, where individual(s) 52 may represent customers moving through POS lane 2, for example, either entering or exiting the venue 100, or checking out with POS station 138, or otherwise interacting with POS station 138. For example, in some embodiments, POS station 138 may be an automated station, where computer system 136 is configured to scan consumer products and accept payment from customers for products that the consumers bring to POS station 138 and POS lane 2.

The venue 100 further includes the centralized controller 16 which may comprise a networked host computer or server. The centralized controller 16 may be connected to one or more detector station(s) 30 positioned throughout the venue 100 via the network switch 18. As further described herein, the detector stations 30 are able to detect targets including, for example, people, such as store personnel 24 or consumers within the store (not shown), as well as the various retail products or items being offered for sale on the floor 102, e.g., clothes 106, handbags 104, etc., that are arranged on shelves, hangers, racks, etc. In addition, each such product may be tagged with a RFID tag for detection as described herein, where consumers carrying the products can be tracked via RFID readers.

Each of the computer systems 116 and 136 may comprise one or more processors and may be in electronic communication with centralized controller 16 via the network switch 18. The network switch 18 may be configured to operate via wired, wireless, direct, or networked communication with one or more of the detector stations 30, where the detector stations 30 may transmit and receive wired or wireless electronic communication to and from the network switch 18. The detector stations may also be in wired and/or wireless communication with computer systems 116 and 136. Similarly, each of the detector stations 30 may either be in either wired or wireless electronic communication with centralized controller 16 via the network switch 18. For example, in some embodiments, the detector stations 30 may be connected via Category 5 or 6 cables and use the Ethernet standard for wired communications. In other embodiments, the detector stations 30 may be connected wirelessly, using built-in wireless transceivers, and may use the IEEE 802.11 (WiFi) and/or Bluetooth standards for wireless communications. Other embodiments may include detector stations 30 that use a combination of wired and wireless communication.

The interfaces 128 and 148 may provide a human/machine interface, e.g., a graphical user interface (GUI) or screen, which presents information in pictorial and/or textual form (e.g., representations of bearings of the RFID-tagged products 104, 106). Such information may be presented to the store personnel 24, or to other store personnel such as security personnel (not shown). The computer systems (116, 136) and the interfaces (128, 148) may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the interfaces (128, 148) may be in a smartphone, or tablet, etc., while the computer systems (116, 136) may be a local computer, or a remotely hosted in a cloud computer. The computer systems (116, 136) may include a wireless RF transceiver that communicates with each detectors station 30, for example, via Wi-Fi or Bluetooth.

Figure 2:
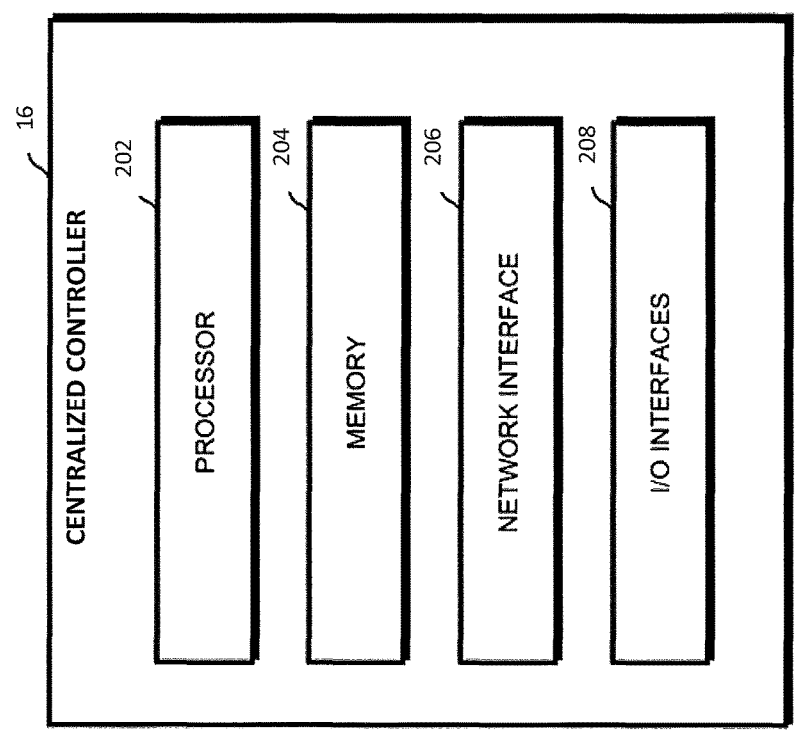
FIG. 2 is a block diagram representative of an embodiment of a centralized controller of FIG. 1.

FIG. 2 is a block diagram representative of an embodiment of centralized controller 16 of FIG. 1. The centralized controller 16 is configured to execute computer instructions to perform operations associated with the systems and methods as described herein, for example, implement the example operations represented by the block diagrams or flowcharts of the drawings accompanying this description. The centralized controller 16 may implement enterprise service software that may include, for example, Restful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. As described below, the centralized controller 16 may be specifically configured for performing operations represented by the block diagrams or flowcharts of the drawings described herein.

The example centralized controller 16 of FIG. 2 includes a processor 202, such as, for example, one or more microprocessors, controllers, and/or any suitable type of processor. The example centralized controller 16 of FIG. 2 further includes memory (e.g., volatile memory or non-volatile memory) 204 accessible by the processor 202, for example, via a memory controller (not shown). The example processor 202 interacts with the memory 204 to obtain, for example, machine-readable instructions stored in the memory 204 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the centralized controller 16 to provide access to the machine-readable instructions stored thereon.

The example centralized controller 16 of FIG. 2 may further include a network interface 206 to enable communication with other machines via, for example, one or more computer networks, such as a local area network (LAN) or a wide area network (WAN), e.g., the Internet. The example network interface 206 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example centralized controller 16 of FIG. 2 includes input/output (I/O) interfaces 208 to enable receipt of user input and communication of output data to the user, which may include, for example, any number of keyboards, mice, USB drives, optical drives, screens, touchscreens, etc.

Figure 3:
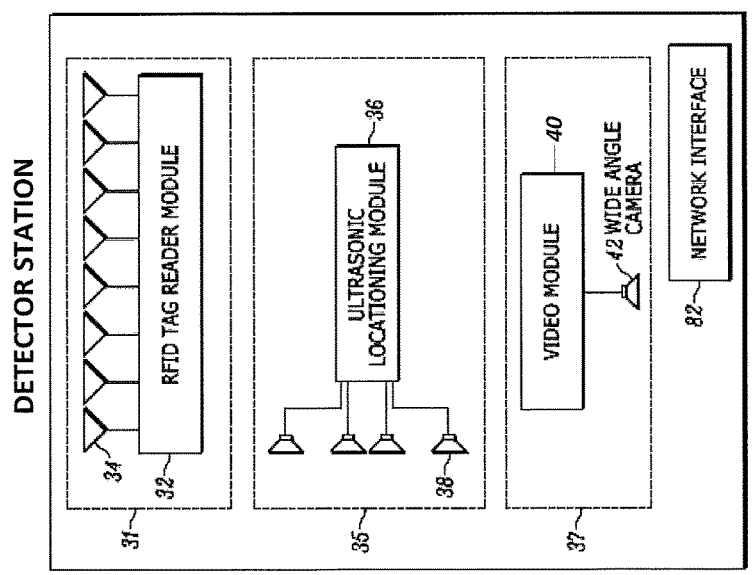
FIG. 3 is a block diagram illustrating an example implementation of a detector station, including several detectors, as may be used in the retail venue of FIG. 1, in accordance with various embodiments.

FIG. 3 is a block diagram illustrating an example implementation of an embodiment of a detector station 30. In the illustrated example, the detector station 30 includes three example detectors 31, 35, and 37, as further described herein. For example, a detector in the form of a RFID tag reader 31 is operative for reading a target (e.g., a RFID tag associated with a product or person). In one embodiment, for example, an RFID tag attached to product resting on a shelf may be read and detected by its attached RFID tag. Similarly, an RFID tag associated with a product that a person has picked up may be detected and tracked as the person moves through the venue 100.

More particularly, as shown in FIG. 3, each RFID reader 31 includes an RFID tag reader module 32 that has a controller, a memory, and an RF transceiver, which are operatively connected to a plurality of RFID antenna elements 34, which are energized by the RFID module 32 to radiate RF energy (also referred to herein as a beam) over an antenna beam pattern. As those of skill will recognize, an antenna and its beam pattern can be characterized by the antenna's beam width (i.e., the antenna's half power beam width). The RF reader 31 is operated, under the control of the tag reader module 32, to transmit RF beam or wave energy to the tags, and to receive RF response signals from the tags, thereby interrogating and processing the payloads of the tags that are in a reading zone of the RF transceiver. The RFID reading zone for a detector station 30 may be a 360° zone defined by the RFID antenna elements 34 and their collective beam patterns. In various embodiments, a detector 30 may include eight RFID antenna elements 34, each maintained in a fixed position and each having a beam pattern extending in a different direction. During operation, the RF transceiver may capture payload data or target data that identifies the tags and their associated products (e.g., retail items 104 and/or 106). The centralized controller 16 may be configured to control the overhead RFID readers in the plurality of detector stations 30 to read the tags on the products (e.g., retail items 104 and/or 106) in a reading mode of operation in accordance with a set of reading parameters.

Referring to FIG. 1, store personnel 24 may hold, carry, and operate any mobile device such as, a mobile phone, or as illustrated by way of non-limiting example, a handheld, portable, mobile RFID tag reader 22 (not shown) during his/her movement within the venue 100. As described below, the store personnel 24 himself/herself and/or the tag reader 22, may each be considered, either individually or jointly, as a mobile target to be located and tracked in the venue. The mobile reader 22 has a controller, a memory, and an RF transceiver operatively connected to an RFID antenna (e.g., RFID antenna 34), which are together operative for reading the product tags associated with products (e.g., 104 and/or 106) in the venue 100. The store personnel 24 may be any individual, employee, operator, or associate authorized to operate the handheld, mobile reader 22. In some embodiments, to initiate reading, the store personnel 24 may actuate an actuator or trigger on the mobile reader 22. More than one mobile reader 22 may be present and/or movable in the venue 100 at a time.

In other embodiments, a detector station may be a Point-of-Sale (PoS) detector station. A POS detector station may include a central RFID reader with multiple remotely positioned RFID antennas local to the individual PoS read zones. For example, with reference to FIG. 1, a POS detector station may relate to POS station 108 and POS lane 1, where the POS detector station includes RFID antennas of detector 30A and/or other RFID antennas local to the POS read zone of POS station 108 and POS lane 1. In some embodiments, a video camera may be used in conjunction with the RFID reader antennas of the POS detector station. In particular embodiments, the video camera may be integrated with an RFID reader (e.g., a video camera 42 of detector station 30A), but in other embodiments the video camera may not be integrated with the RFID reader (e.g., a video camera is located separately from detector station 30A, but still captures images of the POS read zone of POS station 108 and POS lane 1).

Each detector station 30 may include another sensing detector, as shown in FIG. 3. For example, an ultrasonic locationing detector 35 may be operative for locating, for example, a phone, a mobile device, or by way of non-limiting example, the mobile reader 22, by transmitting an ultrasonic signal to an ultrasonic receiver, e.g., a microphone, on the mobile reader 22 or phone. More particularly, the locationing detector 35 includes an ultrasonic locationing module 36 having control and processing electronics operatively connected to a plurality of ultrasonic transmitters, such as voice coil or piezoelectric speakers 38, for transmitting ultrasonic energy to the microphone on the mobile reader 22. The receipt of the ultrasonic energy at the microphone locates the mobile reader 22. Each ultrasonic speaker 38 periodically transmits ultrasonic ranging signals, preferably in short bursts or ultrasonic pulses, which are received by the microphone on the mobile reader 22. The microphone determines when the ultrasonic ranging signals are received. The locationing module 36, under the control of the centralized controller 16, directs all the speakers 38 to emit the ultrasonic ranging signals such that the microphone on the mobile reader 22 will receive minimized overlapping ranging signals from the different speakers 38. The flight time difference between the transmit time that each ranging signal is transmitted and the receive time that each ranging signal is received, together with the known speed of each ranging signal, as well as the known and fixed locations and positions of the speakers 38 on each detector station 30, are all used to determine the location (i.e., position) and/or direction of travel of the microphone and of the mobile reader 22, using a suitable locationing technique, such as triangulation, trilateration, multilateration, etc. Such locationing and direction of travel may be determined by analyzing data from multiple detector stations 30 and centralized controller 16. In some embodiments, some detectors may be configured to determine location, while other detectors may be configured to determine direction of travel.

In the illustrated example of FIG. 3, the detector station 30 may further include a video detector 37 operative for detecting or locating a target by capturing an image of the target in the venue 100, such as a person moving through venue 100 or an item sitting on a shelf of venue 100. More particularly, the video detector 37 may be mounted in each detector station 30 and may include a video module 40 having a camera controller that is connected to a camera 42, which may be, for example, a wide-angle field of view camera for capturing the image of a target. In some embodiments, the camera 42 may be a high-bandwidth, video camera, such as a moving picture expert group (MPEG) compression camera. In other embodiments, the camera may include wide-angle capabilities such that camera 42 would be able to capture images over a large area to produce a video stream of the images. As referred to herein, the image capture devices or video cameras (also referred to as image sensors herein) are configured to capture image data representative of the venue or an environment of the venue. Further, the image sensors described herein are example data capture devices, and example methods and apparatuses disclosed herein are applicable to any suitable type of data capture device(s). In various embodiments, the images or data from the images may be synchronized or fused with other data, such as RFID data, and used to further describe, via data, the venue or environment of the venue. Such synchronized or fused data may be used, for example, by the centralized controller 16 to make determinations or for other features as described herein.

As described, each of the detector stations 30 may collect locationing and direction of travel information from its one or more detectors, such as the RFID reader 31 and/or the ultrasonic detector 35. That information is correlated with the video detector 37 to capture and filter video images based on the location and/or direction of travel of the target, such as a product or person. In particular, a detector station 30 may filter captured video to segment out from the captured wide-angle video, images of the target near the target sensing station, as the target is moved through the venue. That segmenting may result in discarding video images that do not include the target or discarding portions of the wide-angle video that extend beyond an area of interest surrounding and including the target itself.

In various embodiments, focusing, image tilting, and image panning procedures may be determined by first performing image processing on the target in the wide-angle video stream. For example, in some embodiments, a detector station 30 may perform target identification procedures over the determined field of view, procedures such as edge detection to identify the target, segmentation to segment out the target's image from other objects in the video stream, and a determination of any translational, rotational, shearing, or other image artifacts affecting the target image and that would then be corrected for before using the captured target image.

Any of the detector stations 30, including alone, together, or some combination thereof, may transmit electronic information, including any RFID, ultrasonic, video, or other information, to the centralized controller 16 for processing. For example, the central controller 16 of FIG. 2 may include a network communication interface 206 communicatively coupled to network communication interfaces 82 of the detector stations 30 to receive sensing detector data, such as RFID information and/or ultrasonic locationing information, and video stream data, such as a video stream from the wide-angle camera 42. The detector stations 30 may also receive information, commands, or execution instructions, including requests to provide additional sensory or detection information from the centralized controller 16 in order to perform the features and functionally as described herein.

Adaptively Optimizing RFID-Based POS Performance

Figure 4:
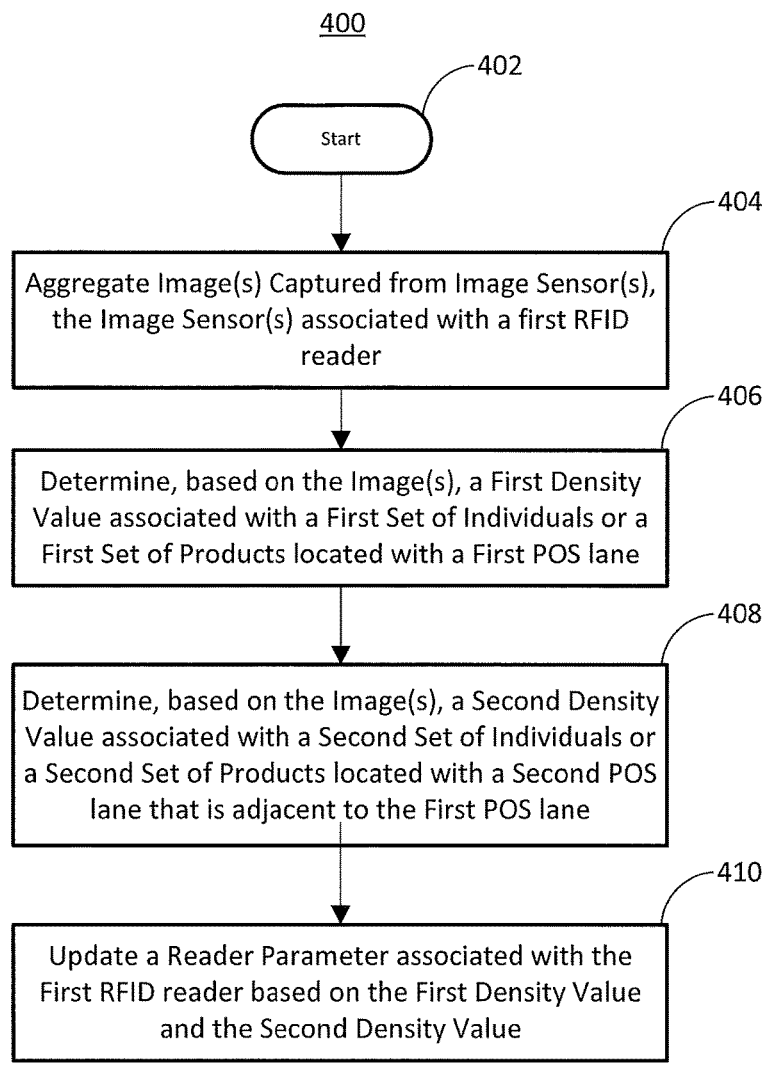
FIG. 4 is a flow chart of a method for adaptively optimizing RFID-based POS performance, in accordance with an example embodiment.

FIG. 4 is a flow chart of a method 400 for adaptively optimizing RFID-based POS performance. As described herein, image(s) captured and aggregated by one or more image sensor(s) (e.g., camera(s) 42 of detector station(s) 30) may be used to reduce read errors and thereby increase the read accuracy and, thus, optimize the performance of the related RFID readers as described herein. In method 400, video analytics on the image(s) may be performed, for example, by the centralized controller 16, to determine the density of individuals or products in a POS lane relative to the density of individuals or products in an adjacent POS lane. The determination may be used to update reader parameter values of one or more RFID readers, including such reader parameters as power, duty cycle, dwell time, session, etc., in order to optimize read performance for the current density of POS activity (e.g., individuals and/or products) at the POS station or lane of interest relative to adjacent POS stations or lanes.

Method 400 may begin (402) at block 404 where centralized controller 16 and its processor 202, as described herein, may activate one or more image sensors (e.g., camera(s) 42 of detector station(s) 30 of FIG. 1) to capture and aggregate image(s), where the image sensor(s) may be associated with a first RFID reader. The image(s) may be aggregated, for example, via memory 204 of centralized controller 16 after being captured by camera(s) 42 and transmitted via wireless or wired communication from the related detector station(s) 30/s network interface(s) 206 to network switch 18.

In some embodiments, the image sensor(s) (e.g., camera 42) may be part of the same detector station 30 as the first RFID reader (e.g., detector station 30A having an RFID reader 31 and an image sensor/camera 42). In other embodiments, the image sensor(s) may be in a different detector station 30 than the first RFID reader (e.g., the first RFID reader is in detector station 30A and the image sensor/camera 42 is in a separate detector station 30C).

At block 406, a first density value may be determined based on the aggregated image(s), where the first density value may be associated with a first set of individuals or a first set of products located within a first POS lane. For example, the individuals may be customers checking out at the first POS lane or customers or other personnel holding merchandise associated with the retail store. As shown in FIG. 1, for example, this may be individual(s) 51, which may be carrying products (e.g., by hand or via shopping chart) and checking out at POS station 108 in POS lane 1, or otherwise moving through or occupying POS lane 1.

Similarly, at block 408 second density value may also be determined based on the image(s), where the second density value is associated with a second set of individuals or a second set of products located within a second POS lane. The second POS lane may be positioned adjacent to the first POS lane. For example, the individuals may be customers checking out at the second POS lane or customers or other personnel holding merchandise associated with the retail store. As shown in FIG. 1, for example, this may be individual(s) 52, which may be carrying products (e.g., by hand or via shopping chart) and checking out at POS station 138 in POS lane 2, or otherwise moving through or occupying POS lane 2.

At block 410, based on the first density value and the second density value, a reader parameter associated with the first RFID reader may then be updated, for example, to optimize the first RFID reader that may be associated with one or both of the POS lanes. For example, in some embodiments, the updated reader parameter may impact a number features, functions, or performance values of a given RFID reader that may each, together or alone, control the operation of the RFID reader. For example, the reader parameter may be any of a power value, a duty cycle value, a dwell time value, a session value, a link profile value, a state flag value, or a select flag value of the RFID reader. Any of these reader parameter values may be adjusted to compensate for, or otherwise control the operation of the RFID reader(s) to operate more effectively for the density values determined from the captured image(s).

In some embodiments, when the level of activity (e.g., density) of individuals or products is deemed to be very high at adjacent POS stations, the read operations of adjacent POS readers can be staggered to minimize interference between the two POS readers (e.g., a first POS reader 31 of detector station 30A for POS lane 1 and a second POS reader 31 of detector station 30B for POS lane 2).

For example, high density values may result in the reader parameters to be adjusted to high levels that may cause interference. Accordingly, in certain embodiments, the first POS lane (e.g., POS lane 1) may be associated with the first RFID reader and the second POS lane (e.g., POS lane 2) may be associated with a second RFID reader. In such embodiments, a first POS read operation of the first RFID reader (e.g., a first POS reader 31 of detector station 30A) may be staggered with respect to a second POS read operation of the second RFID reader (e.g., a second POS reader 31 of detector station 30B) when the first density value and the second density value exceed an activity level threshold.

In still further related embodiments, in order reduce the number of active RFID readers in the space, and, thereby, e.g., decrease radio interference, the image sensor(s) may be used to identify, in at least one example, when a "Lane Open" light is off in order to shut down readers in lanes that are closed. For example, in certain embodiments a particular RFID reader, which can be the first RFID reader (e.g., an RFID reader 31 of detector station 30A), the second RFID reader (e.g., an RFID reader 31 of detector station 30B), or some other RFID reader, associated with a particular POS lane, such as the first POS lane (e.g., POS lane 1), second POS lane (e.g., POS lane 2), or some other POS lane, may be deactivated by, e.g., the centralized controller 16, when the particular POS lane has a lane state indicator with an offline status. In some embodiments, the lane state indicator may be a lane status indicator light, such as the "Lane Open" light. In other embodiments, the lane status indicator light may be some other indicator (e.g., an infrared, LED, or other indicator) that can be imaged by the image sensors. The offline status may be determined, for example, from the one or more images captured from the image sensors. A deactivated RFID reader may either be powered down, or, in alternative embodiments, may still be powered, but no longer in a transmitting or receiving state such that the amount of RFID inference is reduced. In either embodiment, a deactivated RFID reader may be activated again, for example, by an activation signal from the centralized controller 16. For example, turning the "Lane Open" light back on can trigger the centralized controller to activate the RFID reader. In such embodiments, the centralized controller 16 may be configured to activate a particular RFID reader associated with a particular POS lane, where the particular POS lane may have a lane state indicator with an online status.

Steering Product Reader(s) and Determining Product Attributes

Figure 5:
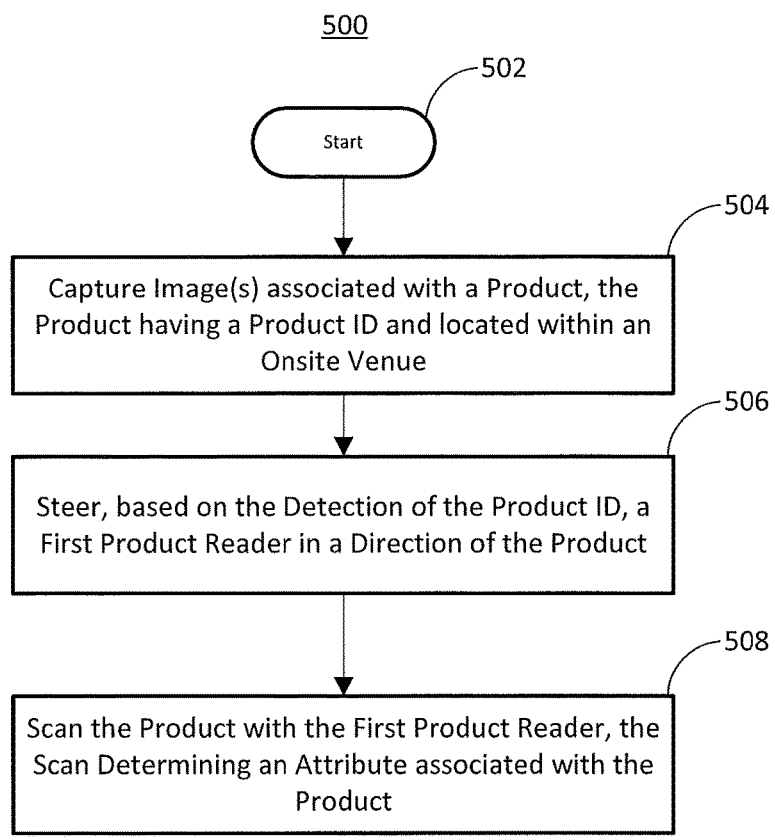
FIG. 5 is a flow chart of a method for product reader control, in accordance with an example embodiment.

FIG. 5 is a flow chart of a method 500 for product reader control. The method 500 may use image sensor(s), such as camera(s) 42 of one or more detector station(s) 30, as described for FIGS. 1 and 3, for use in steering one or more product readers to determine product attributes associated with scanned product(s). The product readers may be steered, and the product attributes may be determined, for example, by one or more processors (such as processor 202 of the centralized controller 16).

Method 500 begins (502) at block 504 where the image sensor(s) may capture, one or more images associated with a product located within an onsite venue. The product may be, for example, retail items (e.g., 104 and 106) located onsite within retail venue 100. The product may have a product identifier, which can include, for example, an RFID tag or a barcode.

At block 506, based on the detection of the product identifier in the image(s), a first product reader may be steered in a direction of the product. The first product reader may be located onsite at the venue, such as retail venue 100, and may be located within the general vicinity of the product. The first product may be detected within the image(s) by centralized controller 16 and then the RFID reader, or any antenna component thereof, may be steered by receiving control instructions from the centralized controller 16. In some embodiments, the first product reader may be an RFID reader, such as a RFID tag reader 31 located in detector stations 30 as described for FIGS. 1 and 3. In other embodiments, the first product reader may be a barcode scanner, such as barcode scanners located at, or in the vicinity of, POS stations 108 and 138 or in the general area of POS lanes 1 and/or 2. The first product reader(s) may be mechanically and/or electronically steered to the direction of the product based on a position of the product identifier determined from the image(s).

At block 508, the first product reader may scan the product such that the scanning, via the one or more processors (e.g., associated with centralized controller 16), determines at least one attribute associated with the product. For example, the attribute may be a price associated with the product, for example a price of the retail items (e.g., 104 and 106).

In some embodiments, a second product reader may also be located within the onsite venue. The second product reader may be associated with a second detector station 30 or a second reader located at or in the vicinity of a POS station (108 or 138) or POS lane 1 or 2. In such an embodiment, the controller station 16 may select one of the detector stations 30 or readers of the POS stations 108 or 138 as the second product reader based on the detected position of the item. The second product reader may be steered in the direction of the product based on the detection of the product identifier in the image(s) captured by the image sensor(s).

The method 500 may further involve a POS area (such as an area associated with POS station 108 and/or POS lane 1, or an area associated with POS station 138 and/or POS lane 2) having a POS reading zone. The POS reading zone may be, for example, an area that RFID readers, barcode reader, other such readers are typically positioned in order to read product identifiers of products of the retail venue 100. In various embodiments, the POS reading zone may be configured to receive products such that a product is determined to be not placed completely within the reader zone based the image(s) captured by the image sensor(s). In such embodiments, the product reader may be redirected to the area of interest to maximize the likelihood of a successful read. For example, the product reader may be electronically and/or mechanically steered to the area of interest as identified in the image(s) captured from the image sensor(s) (e.g., cameras 42 of detector station(s) 30). In some embodiments, the reading zone may occupy an area associated with the bottom of a shopping cart and the first product reader may be steered toward the area when the shopping cart is located within the POS area. The first product reader may be located at a bottom portion of a POS station associated with the POS area, for example, such that the first product reader would be able to scan the reading zone associated with the bottom of a shopping cart. In still further embodiments, the first product reader may be located at a ceiling portion of the onsite venue, such as retail venue 100, associated with the POS area (for example, over POS stations 108 and/or 138 or POS lanes 1 or 2), where, for example, the first product reader would be able to scan products from the ceiling and/or above the products moving into the POS area.

In addition, method 500 may further include an area outside of a POS lane or POS area, e.g., a non-POS area, for example, outside of POS stations 108 and/or 138 or POS lanes 1 or 2. The non-POS area may be configured to be imaged with the image sensor(s), such as camera(s) 42 of detector stations 30, and further configured to be scanned with the first product reader (e.g., RFID tag reader 31 located in detector stations 30 as described for FIGS. 1 and 3) for purposes of determining a product attribute as described herein.

POS Detection for Identifying New RFID Tag Events

Figure 6:
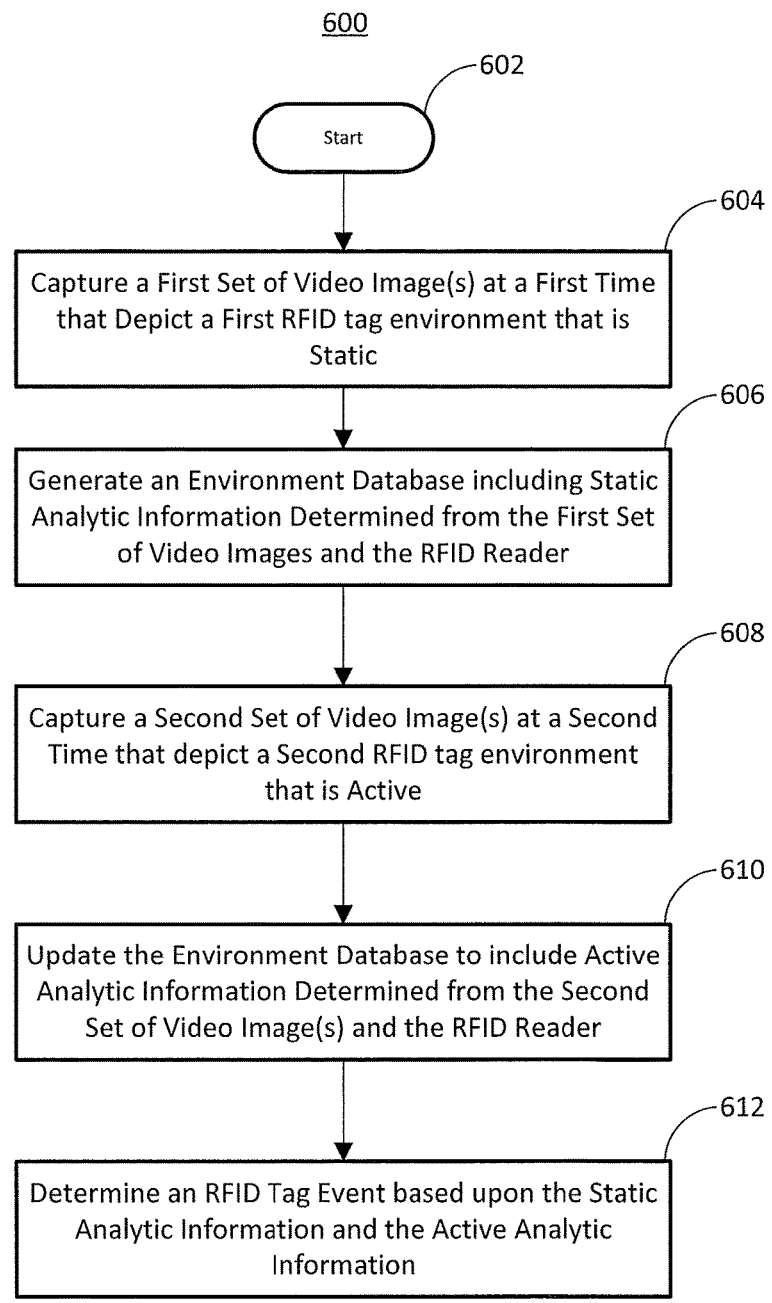
FIG. 6 is a flow chart of a method for identifying new RFID tag events within a particular vicinity of an RFID reader, in accordance with an example embodiment.

FIG. 6 is a flow chart of a method 600 for identifying new RFID tag events within a particular vicinity of an RFID reader. For method 600, motion (e.g., of individuals) in a vicinity of an RFID reader may trigger multipath events that may result in reading tags not normally seen in a given RFID tag environment. For example, a multipath event may be caused by an RFID reader receiving an RF signal by two or more paths, such as a signal from an RFID tag reflecting or refracting with wall or other objects in the retail venue and causing the RFID reader to receive the same signal two or more times. In various embodiments, such events may be reconciled, filtered, or otherwise managed by using video analytics, as further described herein, to build an environment database of a static and active tag environments by identifying static tag reads and new tag reads in conjunction with individuals moving in the vicinity of the RFID reader.

In various embodiments, method 600 may begin (block 602) with one or more processors of a POS system (e.g., centralized controller 16 of FIG. 2) causing one or more image sensors (e.g., one or more cameras 42 of one or more respective detectors stations 30) to capture a first set of one or more video images (block 604), where the first set of video images may be captured at a first time and may depict a first RFID tag environment. For example, the first RFID tag environment may be sales floor 102, or a particular area of sales floor 102, of FIG. 1, such as the particular area associated with product(s) 106 having RFID tags. The first RFID tag environment may be static such that the first set of one or more video images does not depict a person moving within the first RFID tag environment. For example, the image(s) captured by the camera(s) 42 of the respective detectors station(s) 30 may not depict a person or individual moving through the sales floor 102, or particular area of the sales floor 102. The first RFID tag environment may be associated with at least a portion of the particular vicinity of the RFID reader. For example, in particular embodiments, the RFID reader may be an RFID reader 31 of detector station 30D, where the RF range RFID reader 31 of detector station 30D extends over the sales floor 102, or particular area of the sales floor 102, such as one or more POS lanes.

At block 606, the one or more processors may generate an environment database that includes static analytic information determined from the first set of one or more video images and the RFID reader. The environment database may be stored, for example, in memory 204 of centralized controller 16. The database generation may include either creating a new database or may include altering, updating, or otherwise augmenting an existing database with the new static analytic information. The static analytic information may include the video images and RFID reader information as collected from each of the reader 31 and/or cameras 42 of related detector station(s) 30, and/or may further include analysis-based information determined from such images or RFID information, which may include statistical information, machine-learning based information, or other information derived from the images and/or RFID reader information. In several embodiments, the static analytic information may include the first set of one or more video images and a first set of RFID tag identifiers (IDs), where the first set of RFID tag IDs may be associated RFID tags located within the first RFID tag environment.

At block 608, the one or more processors of the POS system may cause the one or more image sensors to capture a second set of one or more video images, where the second set of video images may be captured at a second time and may depict a second RFID tag environment. For example, the second RFID tag environment may the same sales floor 102, or the same particular area of sales floor 102, of FIG. 1 as for the first RFID tag environment, but where the images are captured at the second time. The second RFID tag environment may be active such that the second set of one or more video images depicts at least one person moving within the second RFID tag environment. For example, the image(s) captured by the camera(s) 42 of the respective detectors station(s) 30 may, at the second time, depicts at least one person or individual (e.g., any of individual 51, 52, or store personnel 24 of FIG. 1 or other store individual (not shown)) moving through the sales floor 102, or particular area of the sales floor 102. The second RFID tag environment may also be associated with at least a portion of the particular vicinity of the RFID reader. For example, in particular embodiments, the RFID reader may be the same RFID reader 31 of detector station 30D, where the RF range RFID reader 31 of detector station 30D continues to extend over the sales floor 102, or particular area of the sales floor 102 (e.g., such as one or more POS lanes), at the second time.

In certain embodiments, the person or individual moving through the second RFID tag environment at the second may be located within a POS lane. For example, the person or individual may be individual 51 or individual 52 of FIG. 1. The person or individual may be a person checking out at the POS lane, for example, POS lane 1 of POS station 108. The person may be associated with a product for purchase and the product for purchase may be associated with an RFID tag. The product for purchase may include within its packaging or on its outer or inner portions an RFID tag.

In certain embodiments, the one or more processors (e.g., of the centralized controller 16) may be configured to eliminate a false RFID tag event that occurs at the second time within the particular vicinity of the RFID reader. For example, such embodiments may minimize false POS reads that may occur near POS when there is motion in the vicinity. In some embodiments, the false RFID tag events may be eliminated by storing multipath events (e.g., tag reads) of the first RFID tag environment in the environment data, such that any RFID tags in the first RFID tag environment are associated as static RFID tags. In some embodiments, for example, the multipath events may be used to distinguish physical motion of someone passing through a POS area from the physical motion of someone making a transaction at a POS area (e.g., POS lane 1). In such embodiments, a multipath event may occur in both scenarios, however, images (e.g., the second RFID tag environment as described herein) are used to reconcile which scenario is occurring. For example, an RFID reader antenna (e.g., of a detector station 30) aimed at a POS lane (e.g., POS lane 1) may read a new RFID tag(s) when someone (who is not carrying any merchandise) walks through the area. The video images (e.g., the second RFID tag environment as described herein) may be used to determine that such a scenario is not related to a POS transaction and may instead add the newly read tag(s) to the environment database.

At block 610, the one or more processors (e.g., of the centralized controller 16) may update the environment database to include active analytic information determined from the second set of one or more video images and the RFID reader. Similar to the static analytic information, the active analytic information may include the video images and RFID reader information as collected from each of the reader 31 and/or cameras 42 of related detector station(s) 30, and/or may further include analysis-based information determined from such images or RFID information, which may include statistical information, machine-learning based information, or other information derived from the images and/or RFID reader information. In some embodiments, the active analytic information may further include the second set of one or more video images and a second set of RFID tag identifiers (IDs), where the second set of RFID tag IDs may be associated with RFID tags located in the second RFID tag environment.

At block 612, the one or more processors (e.g., of the centralized controller 16) may also determine at least one RFID tag event based upon the static analytic information and the active analytic information. For example, the RFID tag event may be the identification of a new tag moving (e.g., such as a person or individual with a product having a new RFID tag) within the environment or particular vicinity of the RFID reader that can be tracked by the POS system via the centralized controller 16.

In some embodiments, the one or more processors of the POS system (e.g., the one or more processors of the centralized controller 16) may update the environment database with additional analytic information determined from a third set of one or more video images and the RFID reader. For example, the third set of one or more video images may have been captured at a third time and may depict a third RFID tag environment associated with the at least a portion of the particular vicinity of the RFID reader. Depending on the embodiment, the third RFID tag environment may be either static or active. In this way, the method 600 may continuously loop and update the environment database (e.g., with fourth, fifth, etc. sets of video images and RFID reader information) in order to automatically adapt the environment database over time, and therefore detect RFID tag events that may be reconciled, filtered, or otherwise managed by using the video analytics as described herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A product reader control system enhanced with one or more image sensors and one or more product readers for steering the one or more product readers and for determining product attributes, the product reader control system comprising one or more processors, the product reader control system configured to:
   capture, with the one or more image sensors, one or more images associated with a product, the product having a product identifier and the product located within an onsite venue;
   steer, based on the detection of the product identifier in the one or more images, a first product reader in a direction of the product, the first product reader located within the onsite venue; and
   scan the product with the first product reader, wherein the scan determines at least one attribute associated with the product.

2. The product reader control system of claim 1, wherein the first product reader is any one of the following: an RFID reader or a barcode scanner.

3. The product reader control system of claim 1, wherein the product identifier is any one of the following: an RFID tag or a barcode.

4. The product reader control system of claim 1, wherein the at least one attribute is a price associated with the product.

5. The product reader control system of claim 1, further comprising a POS area having a POS reading zone, the POS reading zone configured to receive products, wherein the product is determined to be not placed completely within the reader zone based on the one or more images.

6. The product reader control system of claim 5, wherein the reading zone occupies an area associated with the bottom of a shopping cart and the first product reader is steered toward the area when the shopping cart is located within the POS area.

7. The product reader control system of claim 6, wherein the first product reader is located at a bottom portion of a POS station associated with the POS area.

8. The product reader control system of claim 5, wherein the first product reader is located at a ceiling portion of the onsite venue associated with the POS area.

9. The product reader control system of claim 1, further comprising a non-POS area, the non-POS area configured to be imaged with the one or more image sensors and further configured to be scanned with the first product reader, wherein the non-POS area is located outside of any POS lane.

10. The product reader control system of claim 1, wherein the first product reader is mechanically steered to the direction of the product based on a position of the product identifier determined from the one or more images.

11. The product reader control system of claim 1, wherein the first product reader is electronically steered to the direction of the product based on a position of the product identifier determined from the one or more images.

12. The product reader control system of claim 1, further comprising a second product reader, the second product reader is located within the onsite venue, and the second product reader steered in the direction of the product based on the detection of the product identifier in the one or more images.

13. A product reader control method, using one or more image sensors, one or more product readers, and one or more processors for steering the one or more product readers and for determining product attributes, the product reader control system comprising:
   capturing, with the one or more image sensors, one or more images associated with a product, the product having a product identifier and the product located within an onsite venue;
   steering, based on the detection of the product identifier in the one or more images, a first product reader in a direction of the product, the first product reader located within the onsite venue; and
   scanning the product with the first product reader, wherein the scan determines at least one attribute associated with the product.

14. The product reader control method of claim 13, wherein the first product reader is any one of the following: an RFID reader or a barcode scanner.

15. The product reader control method of claim 13, wherein the product identifier is any one of the following: an RFID tag or a barcode.

16. The product reader control method of claim 13, wherein the at least one attribute is a price associated with the product.

17. The product reader control method of claim 13, further comprising determining a POS area having a POS reading zone, the POS reading zone configured to receive products, wherein the product is determined to be not placed completely within the reader zone based on the one or more images.

18. The product reader control method of claim 17, wherein the reading zone occupies an area associated with the bottom of a shopping cart and the first product reader is steered toward the area when the shopping cart is located within the POS area.

19. The product reader control method of claim 18, wherein the first product reader is located at a bottom portion of a POS station associated with the POS area.

20. The product reader control method of claim 17, wherein the first product reader is located at a ceiling portion of the onsite venue associated with the POS area.

21. The product reader control method of claim 13, further comprising determining a non-POS area, the non-POS area configured to be imaged with the one or more image sensors and further configured to be scanned with the first product reader, wherein the non-POS area is located outside of any POS lane.

22. The product reader control method of claim 13, wherein the first product reader is mechanically steered to the direction of the product based on a position of the product identifier determined from the one or more images.

23. The product reader control method of claim 13, wherein the first product reader is electronically steered to the direction of the product based on a position of the product identifier determined from the one or more images.

24. The product reader control method of claim 13, further comprising determining a second product reader, the second product reader is located within the onsite venue, and the second product reader steered in the direction of the product based on the detection of the product identifier in the one or more images.

* * * * *